United States Patent [19]
Thompson

[11] Patent Number: 5,872,977
[45] Date of Patent: Feb. 16, 1999

[54] OBJECT-ORIENTED METHOD AND APPARATUS FOR CREATING A MAKEFILE

[75] Inventor: John Alan Thompson, Cupertino, Calif.

[73] Assignee: International Business Machines Corporation, Armonk, N.Y.

[21] Appl. No.: 908,621

[22] Filed: Aug. 8, 1997

[51] Int. Cl.$^6$ .................................................. G06F 9/45
[52] U.S. Cl. ............................................................ 395/703
[58] Field of Search ............................................ 395/703

[56] References Cited

PUBLICATIONS

Continuus Software's Task–Based CM Improves Software Development Process Without the Pain, Continuus Software Corporation web site, Sep. 1996.
Continuus/OM Data sheet for Continuus/OM. Object–oriented Make facility.Continuus Software Corporation web site www.continuus.com, unkn.
Openmake Technical Overview & White Paper, Catalyst Systems Corpration web site www.catsyscorp.com, unkn.

*Primary Examiner*—Allen R. MacDonald
*Assistant Examiner*—Lisa Stevens
*Attorney, Agent, or Firm*—Kudirka & Jobse, LLP

[57] ABSTRACT

A method and apparatus for building a platform dependent makefile from a platform independent "build" file. Accordingly, instead of requiring that a programmer create a plurality of makefiles for a plurality of platforms, the invention enables the programmer to create a single, platform independent build file that may be used across a plurality of platforms. The build file includes arguments that are passed to rules stored in a rules file that create an internal data structure having the information necessary for forming the makefile. The invention then uses the information in this data structure to form the platform dependent makefile.

18 Claims, 4 Drawing Sheets

OBJECT-ORIENTED METHOD AND APPARATUS FOR CREATING A MAKEFILE

COPENDING APPLICATIONS

This application is the one of two sibling patent applications filed on an even date herewith and commonly assigned, including U.S. Patent Application entitled, "OBJECT-ORIENTED METHOD AND APPARATUS FOR EFFICIENTLY COMPILING SOURCE FILES". The subject matter of the above-identified copending patent application is hereby incorporated by reference.

FIELD OF THE INVENTION

This invention relates to compiling software source code and, more particularly, to a method and apparatus for creating platform specific makefiles from non-platform specific source code.

BACKGROUND OF THE INVENTION

In general terms, a computer program which is written by a programmer comprises a series of high-level, human-readable instructions. This set of instructions, commonly referred to as "source code", eventually controls a computer to perform preselected functions or tasks. However, human-readable source code is not in a form that is directly executable by the computer, and, therefore, it must be translated, by another program, called a "compiler", into a set of numbers called "object code" that can be executed by the computer. Object code may be combined with other resources to generate a program, referred to as an "executable program", which can be directly loaded and run by an operating system running on a computer. This program is often designated by an "exe" file extension.

Some prior art source programs consist of a single program file. However, the compilation of a source file of significant size is time consuming, especially with conventional highly-optimizing compilers which often make several passes through the entire file. With a single file, the entire program must be recompiled if any changes are made to any part of the program.

Consequently, it is common practice to divide the source program into smaller files, called source code "modules", each of which can be compiled separately. These modules commonly have a file extension which indicates the type of source code. For example, the file extension "c" denotes source code written in the C language, whereas a file extension "cpp" denotes source code written in the C++ language. In many cases, the object code modules are designated by an "obj" file extension. In this manner, a change to one module does not necessarily affect another module. Inevitably, there are references in one module to entities in another module. These references are handled after compilation of the modules is complete by another program called a "linker" which resolves all references and combines the modules into the finished executable program.

However, in some cases, a reference in a first source code module to an entity in a second source code module requires the first source code module to be recompiled if the second source code module is changed. This type of relationship is called a "dependency" and complicates the compilation and linking process because a change in one module may require recompilation of several other modules which depend on the changed module even though no changes have been made to these other modules.

The art has responded to this problem by using a "make" function to control the compiler. The make function keeps track of the dependencies and controls the compiler to recompile not only source code modules that were modified, but also other modules which depend on the changed modules. The make function is run every time changes are made to any module so that all dependent programs are properly recompiled.

A make function requires that the source code programmer also compose a specialized control file, known as a "makefile", which contains instructions that the make function uses to control the compilation and linking of each of the source code modules when the make function is executed. The makefile typically includes a hierarchy of source modules that embody the dependencies found in the program. For example, a makefile may include a variety of elements such as a series of instructions containing "targets", dependencies, and "shell commands" for updating the targets. Each of these makefile elements are explained in more detail below with reference to a segment of a simplified, exemplary makefile identified as MAKEFILE 1. A sample code fragment from MAKEFILE 1 is as follows:

```
(MAKEFILE 1)
foo.exe: foo.obj                    // BLOCK 1
    icc -fefoo.exe foo.obj
foo.obj: foo.cpp                    //BLOCK 2
    icc -c foo.cpp
    .
    .
    .                               //BLOCK N
```

The "target" of block 1 is the executable program "foo.exe" and the target of block 2 is the object code module "foo.obj." The executable program is formed by first compiling each target in the makefile and then linking the resulting object code files together in a predetermined order. In this case, "foo.exe" also is the executable program to be generated by the program development system and the shell command for linking the object files is icc-fefoo.exe foo.obj. For "foo.exe" to be generated, however, the underlying object code file "foo.obj" first must be compiled. The instructions for compiling "foo.obj" are in block 2. Shell command "icc -c foo.cpp" is the function to initiate this process. The compiler may also locate instructions for compiling other source code files, which instructions are stored in another part of the makefile (represented by the three ellipses). Once all of the target files have been compiled, they are linked together to form the executable program.

One problem with makefiles is that they are written for specific program development systems which, in turn, run on specific computer platforms. Numerous specialized versions of a single makefile therefore must be written so that the make function may be used for compiling the program on different types of platforms. This is time consuming and inefficient for the programmer. Further, any change to the program, such as the addition of a new source code module, requires the programmer to examine the dependencies and modify the makefile.

Accordingly, there is a need for an apparatus and method that enables a single source code file to be written, for use with the make command, that may be used across multiple types of computer platforms. It is among the general objects of the invention to provide such an apparatus and method.

SUMMARY OF THE INVENTION

In accordance with one aspect of the invention, an apparatus includes means for building a platform dependent makefile from a platform independent "build" file. Accordingly, instead of requiring that a programmer create a plurality of makefiles for a plurality of platforms, the invention enables the programmer to create a single, platform independent build file that may be used across a plurality of platforms. The build file includes arguments that are passed to rules stored in a rules file. The called rules in the rules file create an internal data structure having the information necessary for forming the platform dependent makefile. The invention then uses the information in this data structure to form the platform dependent makefile.

BRIEF DESCRIPTION OF THE DRAWING

The above and other features, objects and advantages of the invention will be better understood by referring to the following detailed description in conjunction with the accompanying drawing in which.

DETAILED DESCRIPTION OF THE PREFERRED EMBODIMENT

Figure 1:
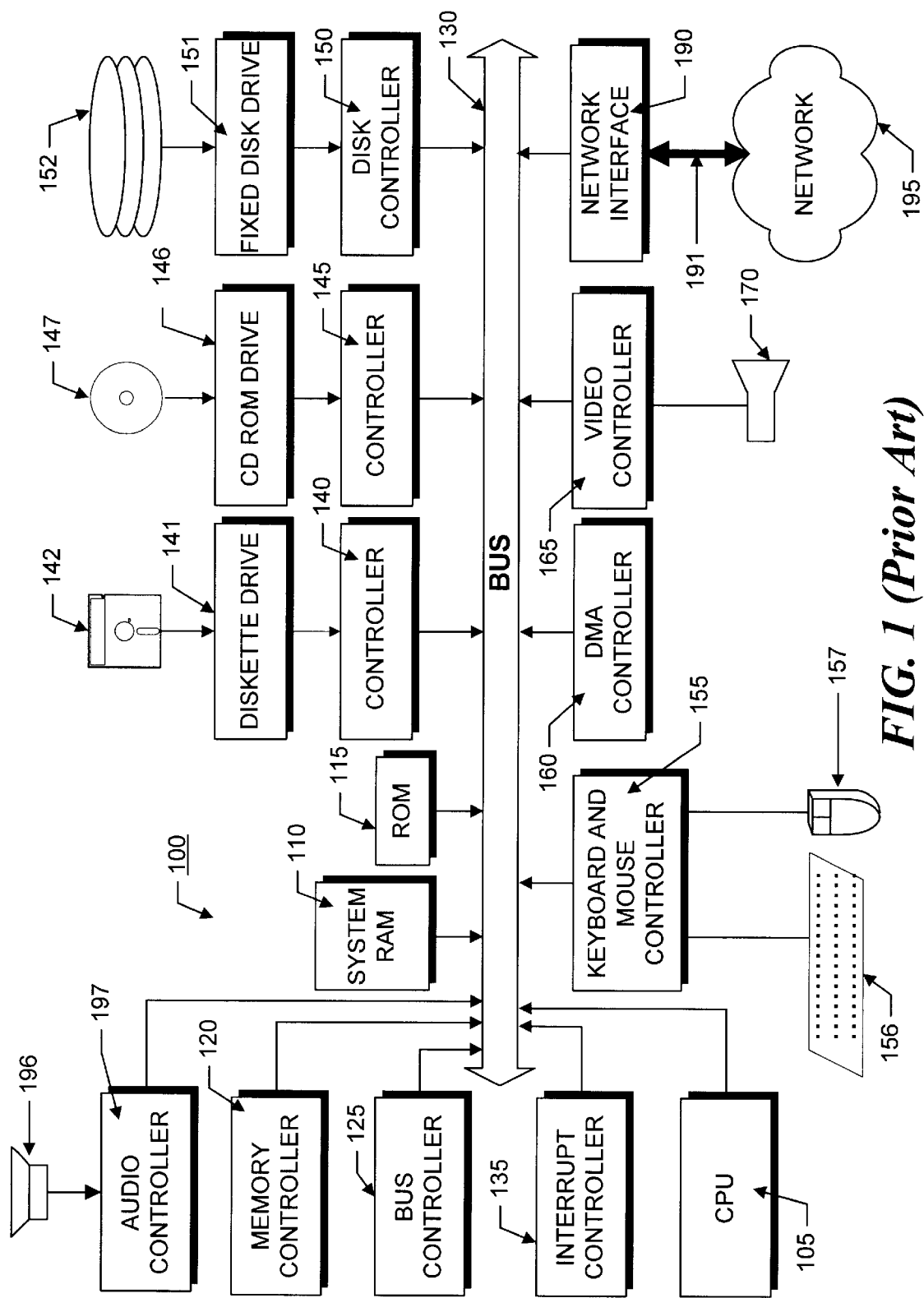
FIG. 1 is a block diagram of a computer system suitable for use with the present invention.

FIG. 1 illustrates the system architecture for an exemplary computer system 100, such as an IBM PS/2® computer, on which the invention can be implemented. The exemplary computer system of FIG. 1 is for descriptive purposes only and should not be considered a limitation of the invention. Although the description below may refer to terms commonly used in describing particular computer systems, such as an IBM PS/2 computer, the described concepts apply equally to other systems, including systems having architectures that are dissimilar to that shown in FIG. 1.

The computer system 100 includes a central processing unit (CPU) 105, which may include a conventional microprocessor, random access memory (RAM) 110 for temporary storage of information, and read only memory (ROM) 115 for permanent storage of information. A memory controller 120 is provided for controlling system RAM 110. A bus controller 125 is provided for controlling bus 130, and an interrupt controller 135 is used for receiving and processing various interrupt signals from the other system components.

Mass storage may be provided by diskette 142, CD-ROM 147, or hard disk 152. Data and software may be exchanged with computer system 100 via removable media, such as diskette 142 and CD-ROM 147. Diskette 142 is insertable into diskette drive 141, which is connected to bus 130 by controller 140. Similarly, CD-ROM 147 is insertable into CD-ROM drive 146, which is connected to bus 130 by controller 145. Finally, a hard disk 152 is part of a fixed disk drive 151, which is connected to bus 130 by controller 150.

User input to computer system 100 may be provided by a number of devices. For example, keyboard 156 and mouse 157 are connected to bus 130 by keyboard and mouse controller 155. An audio transducer 196, which may act as both a microphone and a speaker, is connected to bus 130 by audio controller 197. It should be obvious to those reasonably skilled in the art that other input devices such as a pen and/or tablet and a microphone for voice input may be connected to computer system 100 through bus 130 and an appropriate controller. DMA controller 160 is provided for performing direct memory access to system RAM 110. A visual display is generated by a video controller 165, which controls video display 170. Computer system 100 also includes a network interface 190 which allows the system to be interconnected to a network 195 via bus 191. The network 195 may be a local area network (LAN) or a wide area network (WAN).

Computer system 100 is generally controlled and coordinated by operating system software, such as the OS/2® operating system (available from the International Business Machines Corporation, Boca Raton, Fla.) or WINDOWS® NT (available from Microsoft Corp., Redmond, Wash.). Among other computer system control functions, the operating system controls allocation of system resources and performs tasks such as process scheduling, memory management, networking and I/O services.

Figure 2:
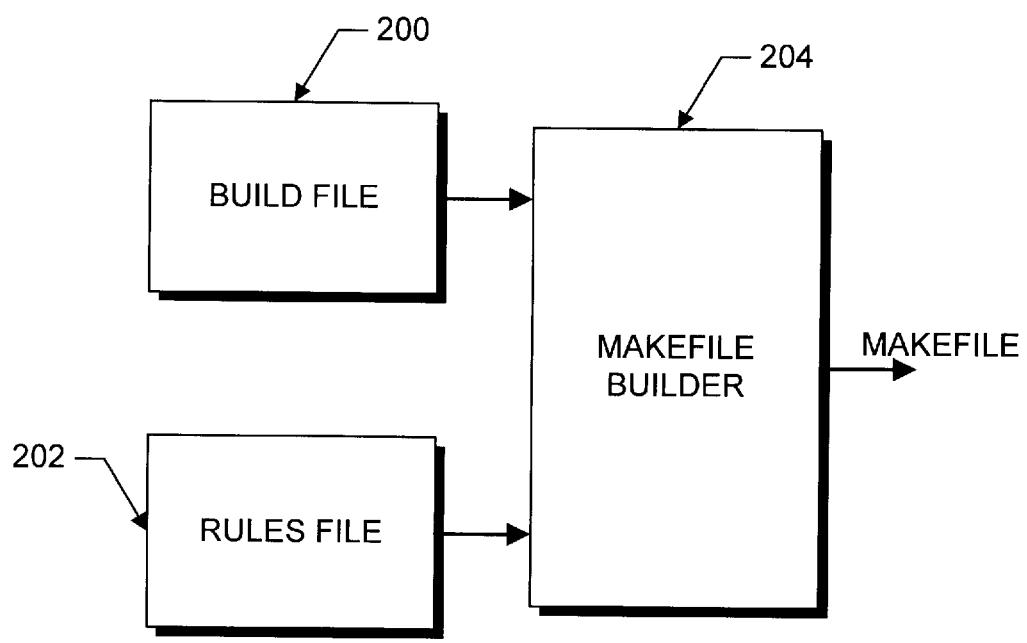
FIG. 2 is a block diagram showing the build file and the components of the invention that together form the makefile.

As shown schematically in FIG. 2, the invention builds a platform dependent makefile from a platform independent "build" file. Accordingly, instead of requiring that a programmer create a separate makefile for each of a plurality of platforms, the invention enables the programmer to create a single, platform independent build file 200 that may be used to create a plurality of platform specific makefiles. Like conventional makefiles, each of these platform specific makefiles is configured to be used with one of the plurality of platforms. To accomplish this platform independence, the invention is configured to include platform specific information for the different platforms with which it is used.

FIG. 2 shows the programmer created build file 200 and the invention. The invention includes a rules file 202 having a plurality of platform specific rules that are called by the build file 200, and a makefile builder 204 for building the makefile from the build file 200 and rules file 202. In the preferred embodiment, the calls from the build file 200 cause a constructor function to build a "dependency engine" in the memory of the computer. The dependency engine includes a list of makerules that together have the necessary data to form the platform dependent makefiles. The invention may be initiated by any convenient means, such as a command line entry or an automated means within the computer.

Below is a simplified template of a build file 200 (TEMPLATE 1) illustrating the components of the build file 200.

```
rule_in_rules_file instance_name        // (TEMPLATE 1)
{   variable1:
        variable1_argument1
        variable1_argument2
    variable2:
        variable2_argument1
        variable2_argument2
        .
        .
        .
}
```

Each element in TEMPLATE 1 is as follows:

* rule_in_rules_file: the call to a rule in the rules file 202;

* instance_name: the name of the (makerule) instance to be created by the called rule;

* variable1: the first of the variables to be passed to the called rule;

* variable1_argument1: the first argument passed to variable1;

* variable1_argument2: the second argument passed to variable1;
* variable2: the second of the variables to be passed to the called rule;
* variable2_argument1: the first argument passed to variable2; and
* variable2_argument2: the second argument passed to variable2.

A sample build file 200 is shown below as BUILD FILE 1.

```
Sharedlibrary    mylib         // (BUILD FILE 1)
{
    PublicHeaders:
        hdr1.hpp
    Sources:
        src1.cpp
        src2.cpp
    Link:
        Otherlib
}
```

This build file 200 calls the rule "SharedLibrary", in the rules file 202 (discussed below), and creates makerules named "mylib." The SharedLibrary rule uses the name "mylib" as the base file name for key targets generated. For example, when used with a Windows® platform, (available from Microsoft Corporation), the SharedLibrary rule creates the target files "mylib.dll" and "mylib.lib." The "Public-Headers" variable generates statements in the makerules that will cause the computer to copy the argument "hdr1.hpp" in a public includes directory. Similarly, the "Sources" and "Link" variables generate instructions in the "mylib" makerule for generating and linking targets, dependencies, and commands.

The rules in the preferred embodiment of the rules file 202 have the form shown below in TEMPLATE 2. See Appendix "A", which includes illustrative class definitions for several exemplary classes in the rules file 202.

```
ruleName    targetBaseName         //TEMPLATE 2
{
    variableSection [variableSection . . . ]]
}
```

Below is an exemplary, non-exhaustive listing of a number of rules that may be included in the rules file 202.

Application
Build a graphical user interface application executable in a specified build phase and copy the application to BinariesDir.

Compile
Compiles files. This rule is intended to be used to compile files with special options. It will exclude the source files it processes from later rules. For example, if a later rule uses "*.cpp" in the "Sources" tag section, the files in a previous "Compile" rule will be excluded.

Copy
Copies file. The last argument is the destination file/directory, i.e.:
Copy {file1 file2 dest }

Clean
Specify additional files to clean, i.e.:

```
Clean
{
        file1.xxx
        file2.xxx
}
    or
    Clean: file1.xxx file2.xxx
```

Export
Like a build rule, but only exports files using the following variables:
Binaries
  Copies files to BinariesDir.
Data
  Copies files to DataDir.
Libraries
  Copies files to LibrariesDir.
PrivateHeaders
  Copies files to PrivateDir.
PublicHeadersDir
  Copies files to PublicHeadersDir.
Scripts
  Copies files to BinariesDir.
TestScripts
  Copies files to TestScriptsDir.
Library
This is a special build rule that will build a static or shared library. By default, a shared library will be built.
MakeRule
This rule can be used to output an arbitrary rule to the makefile.
ObjectLibrary
Build a static link library in a specified build phase and copy the library to ObjectLibrariesDir. This rule is used to build subcomponents of a shared library.
OpenClassLibrary
This is a special build rule that will build a static or shared library with a special coded name. By default, a shared library will be built. This rule also provides an additional variable, "AlternateName" for specifying a two-letter name to be used to construct a managed library name.
Program
Build a stdio executable program in a specified build phase and copy the library to BinariesDir.
SharedLibrary
Build a shared library in a specified build phase and copy it to BinariesDir.
SharedLibraryObjects
Build one or more shared library object files in a specified build phase.
TestApplication
Build a graphical user interface application executable in a specified build phase and copy it to TestBinariesDir.
TestSharedLibraryObjects
Build one or more shared library object files in a specified build phase.

Figure 3:
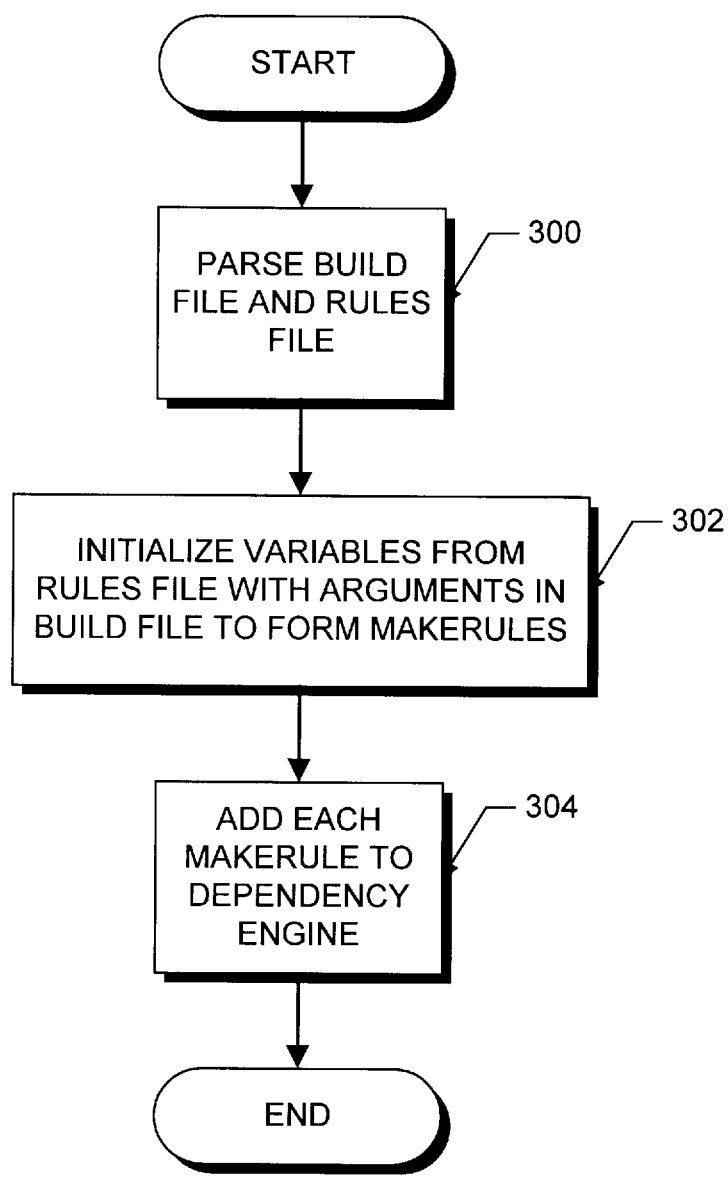
FIG. 3 is a flow chart illustrating the steps of forming an exemplary dependency engine.

FIG. 3 shows an illustrative process used by the makefile builder 204 for constructing the dependency engine from the build file 200 and rules file 202. The process starts at step 300 by parsing the build file 200 and rules file 202 to form a parsing tree. This converts the data into a form that may be utilized by the computer. At step 302, the variables are initialized by causing the build file 200 to call the rules file 202, thereby forming a plurality of makerules. At step 304, each of the makerules are added to the dependency engine, thus completing the process.

MAKERULE 1 below is an exemplary template showing the elements of a makerule formed in accordance with a preferred embodiment of the invention.

```
MakeRule target                    // MAKERULE 1
{
    Dependents:
        dep1 dep2
    Commands:
        "Is -1 dep1 dep2"
        "rm -rf dep1 dep2"
}
```

Each element in MAKERULE 1 is as follows:
* MakeRule: The name of the makerule;
* target: the target file to be formed that utilizes this makerule;
* Dependents: a listing of the dependent files (i.e., dep1 and dep2) used to form the target file; and
* Commands: a listing of commands (i.e. "Is -1 dep1 dep2" and "rm -rf dep1 dep2") used to form the target.

Figure 4:
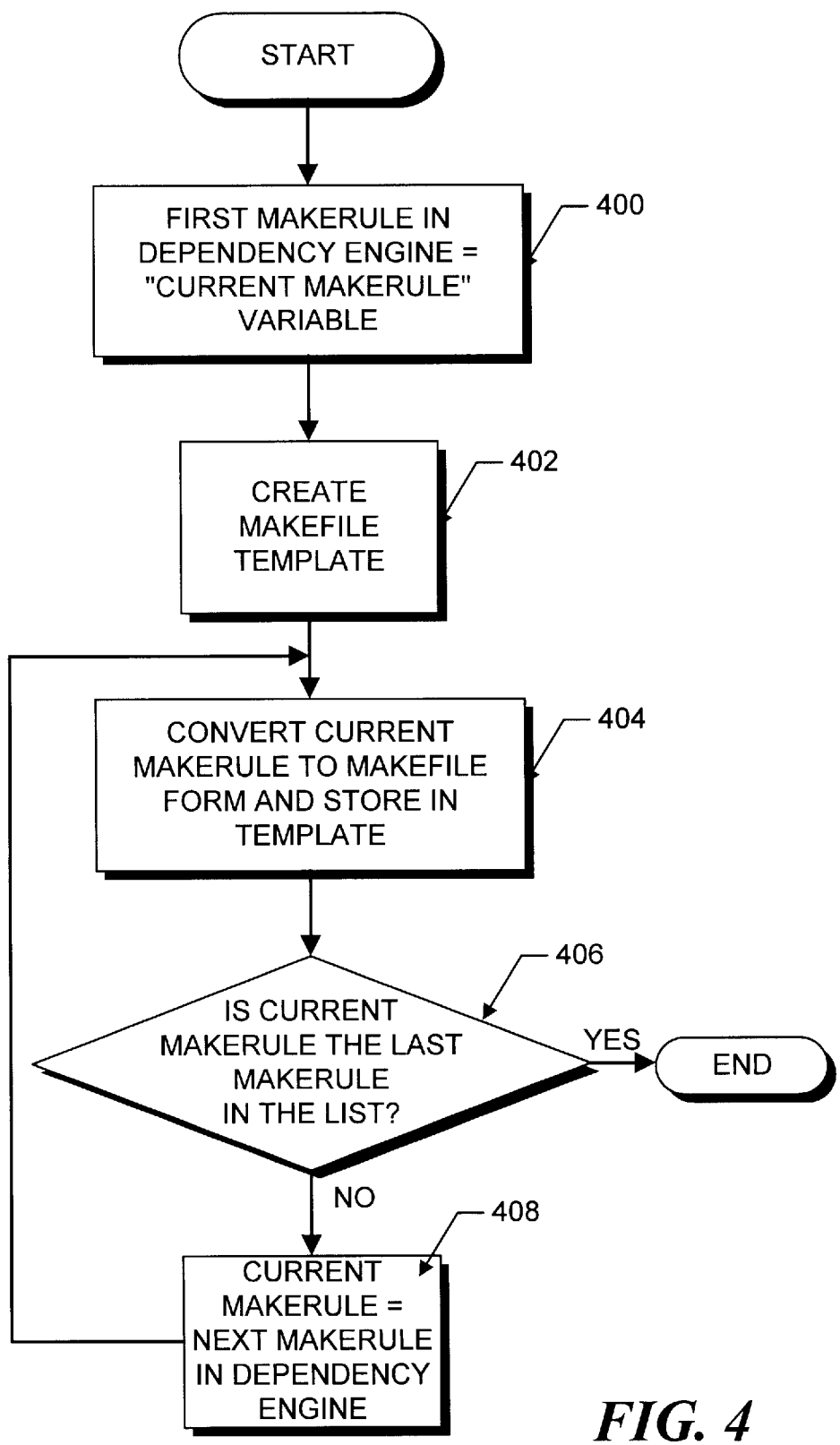
FIG. 4 is a flow chart illustrating the steps for forming a makefile from the exemplary dependency engine.

Accordingly, each makerule includes the information that is necessary for building the makefiles. More particularly, FIG. 4 shows a process of forming the makefiles from the makerule list in the dependency engine. The process begins at step 400 in which a "current makerule" variable is initialized to be the first makerule in the dependency engine list. At step 402, a makefile template is created for arranging information from the makerule list into a makefile. MAKEFILE 2 below shows the form of the makefile template having "z" blocks.

```
target: dep1_dep_2 . . . dep_m         //MAKEFILE 2
    Is -1 dep_1 dep_2 . . . dep_m
    rm -rf dep_1 dep_2 . . . dep_m
dep_1: dep_3dep_4 . . . dep_n
    Is -1 dep_1 dep_2 . . . dep_n
    rm -rf dep_1 dep_2 . . . dep_n
    .
    .
    .
dep_z: dep_x dep_y . . . dep_z
    Is -1 dep_x dep_y . . . dep_z
    rm -rf dep_x dep_y
```

At step 404, information from the current makerule is converted into one block of the makefile. Specifically, the current makerule contains all the necessary information to create one block of the makefile. Such information includes a target, dependencies, and commands. At step 406, it is ascertained if the current makerule is the last makerule in the list. If yes, the process ends and the makefile is completed. If no, the process continues to step 408 in which the current makerule variable is set to the next makerule in the list. The process then loops back to step 404 for converting the current makerule into makefile form.

This process therefore creates a platform specific makefile from platform independent source code (i.e., in the build file 200). Once the makefile is created, the make command may be executed to recompile only those source files have not been edited since a previous compilation.

In the preferred embodiment, the invention is implemented in an object-oriented programming language, such as C++, using object-oriented programming techniques. C++ is a compiled language, meaning that programs are written in a human-readable script that is provided to another program, called a "compiler", which generates a machine-readable numeric code that can be loaded into, and directly executed by, a computer. As described below, the C++ language has certain characteristics which allow a software developer to easily use programs written by others while still providing a great deal of control over the reuse of programs, thereby preventing their destruction or improper use. The C++ language is well-known and many articles and texts are available which describe the language in detail. In addition, C++ compilers are commercially available from several vendors, including Borland International, Inc. and Microsoft Corporation. Accordingly, for reasons of clarity, the details of the C++ language and the operation of the C++ compiler will not be discussed in further detail herein.

As will be understood by those skilled in the art, Object-Oriented Programming (OOP) techniques involve the definition, creation, use and destruction of "objects." Objects are software entities comprising data elements (i.e., "attributes") and methods (i.e., "functions" or "rules") that manipulate the data elements. Attributes and related methods are treated by the software as an entity and can be created, used and deleted as if they were a single item. The attributes and methods together enable objects to model virtually any real-world entity in terms of its characteristics (represented by the data elements) and its behavior (represented by its data manipulation functions). In this way, objects can model both concrete things (e.g., people or computers) and abstract concepts (e.g., numbers or geometrical designs).

Objects are defined by creating "classes", which are templates that instruct the compiler how to construct the actual object. By way of example, a class may specify the number and type of data variables, and the steps involved in the methods that manipulate such data variables. When an object-oriented program is compiled, the class code is compiled into the program. No objects exist at such time. Therefore, none of the variables or data structures in the compiled program exist or have any memory allotted to them. An object actually is created by the program at runtime by a specialized function called a "constructor" that uses the corresponding class definition and additional information, such as arguments provided during object creation, to construct the object. Conversely, objects are destroyed by a special function called a "destructor." Objects may be utilized by using their data and invoking their functions. When an object is created at runtime, memory is allotted and data structures are created.

The principle benefits of object-oriented programming techniques arise out of three basic principles; namely encapsulation, polymorphism and inheritance. More specifically, objects can be designed to hide (i.e., encapsulate) all, or a portion of, the internal data structure and the internal functions. More particularly, during program design, a program developer can define objects in which all or some of the attributes and all or some of the related functions are considered "private" or for exclusive use by the object itself. Other data or functions can be declared "public" or available for use by other programs. Access to the private variables by other programs can be controlled by defining public functions for an object that may facilitate access to the private data of such object. The public functions form a controlled and consistent interface between the private data and the "outside" world. Any attempt to write program code which directly accesses the private variables causes the compiler to generate an error during program compilation. This error stops the compilation process and prevents the program from being executed.

Polymorphism is a OOP concept that allows objects and functions having the same overall format, but which work with different data, to function differently in order to produce consistent results. For example, an addition function may be defined as a variable A plus a variable B (A+B). This same format can be used whether the A and B are numbers, characters, or dollars/cents. However, the actual program code that performs the addition may differ widely depending on the type of variables that comprise A and B. Polymorphism allows separate function definitions to be written for each type of variable (e.g., numbers, characters and dollars/cents). After the functions have been defined, a program subsequently can refer to the addition function by its common format (A+B) and, at runtime, the program will determine which of the three functions is actually called by examining the variable types. Polymorphism allows similar functions that produce analogous results to be "grouped" in the program source code to produce a more logical and clear program flow. A similar process, called "overloading" can be used to create polymorphic operators such as "=" or ">." Overloading creates several definitions for each operator, one of which is chosen at runtime.

The third principle which underlies object-oriented programming is "inheritance", which allows program developers to easily reuse existing programs, thus eliminating the need to create software from scratch. The principle of inheritance allows a software developer to declare classes (and the objects that are later created from them) as related. Specifically, classes may be designated as subclasses of other base classes. A subclass "inherits" and has access to all of the public functions of its base classes just as if these function appeared in the subclass. Alternatively, a subclass can override some or all of its inherited functions, or may modify some or all of its inherited functions, by defining a new function with the same form. Overriding does not alter the function in the base class, however, but merely modifies the use of the function in the subclass. The creation of a new subclass having some of the functionality (with selective modification) of another class allows software developers to easily customize existing code to meet their particular needs.

Accordingly, the data structures used to build the makefile are objects or groups of objects. In particular, the build file 200, rules file 202, and makefile builder 204, in accordance with the preferred embodiment of the invention, reside in system memory as a network of objects interconnected through object pointers. In contrast to implementation with a procedural programming language, use of object oriented programming techniques significantly simplifies future modification of the invention. This is especially useful as new platforms are developed that may be used to implement the invention.

In another alternative embodiment, the invention may be implemented as a computer program product for use with a computer system. Such implementation may include a series of computer instructions fixed either on a tangible medium, such as a computer readable media (e.g. diskette 142, CD-ROM 147, ROM 115, or fixed disk 152 as shown in FIG. 3) or transmittable to a computer system, via a modem or other interface device, such as network interface 190 connected to the network 195 over a medium 191. Medium 191 may be either a tangible medium (e.g., optical or analog communications lines) or a medium implemented with wireless techniques (e.g., microwave, infrared or other transmission techniques). The series of computer instructions embodies all or part of the functionality previously described herein with respect to the invention. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable media with accompanying printed or electronic documentation (e.g., shrink wrapped software), preloaded with a computer system (e.g., on system ROM or fixed disk), or distributed from a server or electronic bulletin board over a network (e.g., the Internet or World Wide Web).

Although only one embodiment of the invention has been disclosed, it will be apparent to those skilled in the art that various changes and modifications can be made that will achieve some of the advantages of the invention without departing from the spirit and scope of the invention. These and other obvious modifications are intended to be covered by the appended claims.

August 8, 1997
ST9-96-506

APPENDIX A

```
*******************
*** makerule.cmi ***
*******************/

// makerule.cmi - cmake/cmakeit file for demonstration of generic make
rule definition.

// constants integer true = 1;      // boolean true
integer false = 0;     // boolean false // generic make rule rule MakeRule
{
    // member variables (tags)
    file Target;          // target
    list Dependents;      // dependents
    list Commands;        // commands // constructor
    function MakeRule(file targetName)
    {
        // set Target member
        Target = targetName;

// call built in function to define internal rule
        AddMakeRule(
            Target,        // target
            Dependents,    // dependents
            Commands,      // commands
```

August 8, 1997
ST9-96-506

```
        false);    // false means single dependency (one ':')
    }
}

/******************
*** makerule.cmk ***
******************/

// makerule.cmk - cmake/cmakeit file for demonstrating use of
//   the generic make rule.

#include <makerule.cmi>    // include rule definition

// use MakeRule to build "mytarget"

MakeRule mytarget
{
   Dependents:
      foo.hpp
      foo.cpp
      bar.cpp
   Commands:
      ("echo " + (string)Dependents)    // just display dependents
}

/******************
*** makerule.mak ***
******************/

# Makefile generated from makerule.cmk using cmakeit

```

```
        foo.hpp\
        foo.cpp \
        bar.cpp
echo foo.hpp foo.cpp bar.cpp
```

```
/******************
*** comprule.cmi ***
******************/

// comprule.cmi - cmake/cmakeit file for demonstration of
//   generic compile rule definition.

#include <makerule.cmi>  // include MakeRule definition

// constants
#define kFullDeps 32      // find compile dependents flag

// plaform variables string Compiler              = "icc";   // compiler
string CompileSourceSuffix   = ".cpp";  // compiler source suffix
string CompileTargetSuffix   = ".obj";  // compiler target suffix
string CompileDefaultOptions = "-c";    // default compile options
string CompileDebugOption    = "-Ti+";  // debug option for compiler
string CompileOutputOption   = "-Fo";   // output option for compiler
string CompileOptions        = "";      // global compile options // generic compile rule rule Compile : MakeRule  // inherits from MakeRule
{
    // member variables (tags)
```

August 8, 1997
ST9-96-506

```
    list Sources;                        // source files
    string CompileOptions  = ::CompileOptions;    // local compile options
    integer Debug      =                 // build for debug flag
#if DEBUG
        true;
#else
        false;
endif // overridable function for doing further processing
    function Process(file targetName)
    {
       return(targetName);    // by default do nothing
    }

// constructor
    function Compile(file targetName)
    {
       for (iterator iter(Sources); iter; iter++)
       {
          // get source and destination files
          file src = *iter;
          file dst = src.ReplaceExtension(CompileTargetSuffix);

// format command line
          string cmd = Compiler + " "               // compiler name
              + CompileDefaultOptions + " "         // default compile options
              + CompileOptions + " "                // user compile options
              + (Debug ? CompileDebugOption + " " : "")  // debug option
              + CompileOutputOption + dst + " "     // output
```

-24-

August 8, 1997
ST9-96-506

```
        option and target
                + src;                  // source file // use built in function to find header dependents
        list deps = FindCompileDependencies(cmd, kFullDeps);

deps.AddFirst(src);    // add source file as dependent

// define one compile make rule
        AddMakeRule(           // call built in function to define one compile rule
            dst,               // target
            deps,              // dependents
            list(cmd),         // commands
            false);            // false means single dependency (one ':')

Dependents += dst;     // add target to main dependents
    }

// allow derived rules to do additional processing
        Process(targetName);

// call parent constructor to define make rule
        MakeRule(targetName);
    }
}

/******************
*** comprule.cmk ***
******************/

// comprule.cmk - cmake/cmakeit file for demonstrating
//    use of generic compile rule.
```

-25-

August 8, 1997
ST9-96-506

```
#include <comprule.cmi>    // include rule definition

// use Compile to generate target "mytarget" to compile
// one or more files

Compile comps
{
  CompileOptions:
    -DMYDEFINE

Sources:      // sources to compile
    foo.cpp
    bar.cpp
}

/******************
*** comprule.mak ***
******************/

Makefile generated from comprule.cmk using cmakeit foo.obj:    foo.cpp\
            foo.hpp
    icc -c -DMYDEFINE -Ti+ -Fofoo.obj foo.cpp bar.obj:    bar.cpp icc -c -DMYDEFINE -Ti+ -Fobar.obj. bar.cpp comps:      foo.obj\
```

August 8, 1997
ST9-96-506

*bar.obj*

```
/******************
*** linkrule.cmi ***
******************/

// linkrule.cmi - cmake/cmakeit file for demonstration of
//   generic link rule definition.

#include <comprule.cmi>  // include Compile rule definition

// plaform variables string Linker            = "ilink";    // linker
string ProgramSuffix     = ".exe";     // program target suffix
string LinkDebugOption   = "/DEBUG";   // debug option for linker
string LinkOutputOption  = "/OUT:";    // output option for linker
string LinkOptions       = "";         // global link options // generic link rule for building a program rule Program : Compile    // inherits from Compile
{
      // member variables (tags)
    string LinkOptions = ::LinkOptions;   // local compile options // override processing function called from Compile
    function Process(file targetName)
    {
          // format command
        string cmd = Linker + " "                          // linker
           + LinkOptions + " "                             // linker options
           + (Debug ? LinkDebugOption + " " : "")          // debug option
           + LinkOutputOption + targetName + " "           // output option
           + (string)Dependents;                           // object files
```

-27-

August 8, 1997
ST9-96-506

```
        // add to command list
        Commands += cmd;
    }

// constructor
    function Program(file targetName)
    {
        // call parent constructor to do main work
        Compile(targetName + ProgramSuffix);
    }
}

/******************
*** linkrule.cmk ***
******************/

// linkrule.cmk - cmake/cmakeit file for demonstrating
//   use of generic program linking rule.

#include <linkrule.cmi>     // include rule definition

// use Compile to generate target "mytarget" to compile
    // one or more files Program myprog
{
    CompileOptions:
        -DMYDEFINE Sources:       // sources to compile
        foo.cpp
        bar.cpp
}
```

August 8, 1997
ST9-96-506

```
/*****************
*** linkrule.mak ***
*****************/

Makefile generated from linkrule.cmk using cmakeit foo.obj:    foo.cpp\
            foo.hpp icc -c -DMYDEFINE -Ti+ -Fofoo.obj foo.cpp bar.obj:    bar.cpp
       icc -c -DMYDEFINE -Ti+ -Fobar.obj bar.cpp myprog.exe: foo.obj\
            bar.obj
       ilink /DEBUG /OUT:myprog.exe foo.obj bar.obj
```

-29-

What is claimed is:

1. A method of constructing a platform specific makefile in a computer system having a memory, the makefile having instructions for constructing an executable program, the method comprising the steps of:

A. receiving a request for constructing the makefile;
   B. accessing, responsive to step A, a build file in the memory of the computer, the build file being non-plafform specific and having calls to at least one platform specific rule in a rules file, the rules file being in the memory of the computer system;
   C. accessing, responsive to step B, the rules file; and
   D. executing, responsive to step C, the rules called by the build file to construct the makefile.

2. The method of constructing a makefile as defined by claim 1 wherein step D comprises the further steps of:

D1. calling a makerule constructor for constructing, from the rules file and build file, a plurality of makerule instances, each makerule instance comprising a target, a dependency, and a command.

3. The method of constructing a makefile as defined by claim 2 wherein step D comprises the further step of:

D2. forming a sequential list comprising the plurality of makerule instances.

4. The method of constructing a makefile as defined by claim 3 wherein step D comprises the further step of:

D3. creating a makefile template; and
   D4. entering the target, dependency, and command for each makerule instance in the list into the makefile template.

5. The method of constructing a makefile as defined by claim 1 wherein the request for constructing a makefile is transmitted from a command line in the computer system.

6. The method of constructing a makefile as defined by claim 1 wherein the build file includes initialization variables for the rules in the rules file.

7. An apparatus for constructing a platform specific makefile in a computer system having a memory, the makefile having instructions for constructing an executable program, the apparatus comprising:

a build file in the memory of the computer and being non-platform dependent;
   a rules file in the memory of the computer and comprising a plurality of platform specific rules;
   means for receiving a request for constructing the makefile;
   first means for accessing, responsive to the receiving means, the build file, the build file having calls to at least one rule in the rules file;
   second means for accessing, responsive to the first accessing means, the rules file; and
   means for executing, responsive to the second accessing means, the rules called by the build file to construct the makefile.

8. The apparatus for constructing a makefile as defined by claim 7 wherein the executing means comprises:

means for forming a parsing tree from the rules file and the build file; and
   means for calling a makerule constructor for constructing, from the parsing tree, a plurality of makerule instances, each makerule instance comprising a target, a dependency, and a command.

9. The apparatus for constructing a makefile as defined by claim 8 wherein the executing means further comprises:

means for forming a sequential list comprising the plurality of makerule instances.

10. The apparatus for constructing a makefile as defined by claim 9 wherein the executing means further comprises:

means for creating a makefile template; and
    means for entering the target, dependency, and command for each makerule instance in the list into the makefile template.

11. The apparatus for constructing a makefile as defined by claim 7 wherein the request for constructing a makefile is transmitted from a command line in the computer system.

12. The apparatus for constructing a makefile as defined by claim 7 wherein the build file includes initialization variables for the rules in the rules file.

13. A computer program product comprising:

a computer usable medium having computer readable program code thereon for constructing a platform specific makefile in a computer system having a memory, the makefile having instructions for constructing an executable program, the computer readable program code comprising:
    program code for receiving a request for constructing the makefile;
    first program code for accessing, responsive to the program code for receiving, a build file in the memory of the computer, the build file being non-platform specific and having calls to at least one platform specific rule in a rules file, the rules file being in the memory of the computer system;
    second program code for accessing, responsive to the first program code for accessing, the rules file; and
    program code for executing, responsive to the second program code for accessing, the rules called by the build file to construct the makefile.

14. The computer program product as defined by claim 13 wherein the program code for executing comprises:

program code for forming a parsing tree from the rules file and the build file; and
    program code for calling a makerule constructor for constructing, from the parsing tree, a plurality of makerule instances, each makerule instance comprising a target, a dependency, and a command.

15. The computer program product as defined by claim 14 wherein the program code for executing further comprises:

program code for forming a sequential list comprising the plurality of makerule instances.

16. The computer program product as defined by claim 15 wherein the program code for executing further comprises:

program code for creating a makefile template; and
    program code for entering the target, dependency, and command for each makerule instance in the list into the makefile template.

17. The computer program product as defined by claim 13 wherein the request for constructing a makefile is transmitted from a command line in the computer system.

18. The computer program product as defined by claim 13 wherein the build file includes initialization variables for the rules in the rules file.

* * * * *